United States Patent
Chang et al.

(10) Patent No.: US 9,687,802 B2
(45) Date of Patent: *Jun. 27, 2017

(54) APPARATUS AND METHOD FOR CONTINUOUSLY PRODUCING CARBON NANOTUBES

(75) Inventors: Kwang-Hyun Chang, Daejeon (KR); Jin-Do Kim, Daejeon (KR); Kwang-Woo Yoon, Gyeonggi-do (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/981,597

(22) PCT Filed: Aug. 19, 2011

(86) PCT No.: PCT/KR2011/006161
§ 371 (c)(1),
(2), (4) Date: Jul. 24, 2013

(87) PCT Pub. No.: WO2012/138017
PCT Pub. Date: Oct. 11, 2012

(65) Prior Publication Data
US 2013/0315813 A1 Nov. 28, 2013

(30) Foreign Application Priority Data

Apr. 4, 2011 (KR) .................. 10-2011-0030514
Apr. 6, 2011 (KR) .................. 10-2011-0031471

(51) Int. Cl.
*B01J 8/24* (2006.01)
*C01B 31/02* (2006.01)
(Continued)

(52) U.S. Cl.
CPC .............. *B01J 8/10* (2013.01); *B01D 45/12* (2013.01); *B01J 8/006* (2013.01); *B01J 8/0055* (2013.01);
(Continued)

(58) Field of Classification Search
CPC ..... C01B 31/0226; C01B 31/024; D01F 9/133
See application file for complete search history.

(56) References Cited

U.S. PATENT DOCUMENTS

| | | | | |
|---|---|---|---|---|
| 4,360,505 A | * | 11/1982 | Sheridan, III | B01D 53/0473 420/900 |
| 4,440,548 A | * | 4/1984 | Hill | 95/100 |
| 6,905,544 B2 | * | 6/2005 | Setoguchi et al. | 117/105 |
| 2004/0151654 A1 | * | 8/2004 | Wei et al. | 423/447.3 |
| 2005/0042162 A1 | * | 2/2005 | Resasco et al. | 423/447.3 |
| 2007/0025906 A1 | * | 2/2007 | Pirard et al. | 423/447.3 |
| 2007/0215520 A1 | * | 9/2007 | Edwin et al. | 208/46 |
| 2008/0247939 A1 | * | 10/2008 | Iyuke | 423/447.3 |
| 2008/0274277 A1 | | 11/2008 | Rashidi et al. | |
| 2009/0000480 A1 | | 1/2009 | Dardas et al. | |
| 2010/0068123 A1 | * | 3/2010 | Edwin et al. | 423/447.2 |
| 2013/0302238 A1 | * | 11/2013 | Chang et al. | 423/447.2 |

(Continued)

FOREIGN PATENT DOCUMENTS

JP  2004076197 A  3/2004
JP  2009007237 A  1/2009

(Continued)

OTHER PUBLICATIONS

Pirard, et al.: "Modeling of a Continuous Rotary Reactor for Carbon Nanotube Synthesis by Catalytic Chemical Vapor Deposition", AIChE Journal, vol. 55, No. 3, Mar. 2009, pp. 675-686.

*Primary Examiner* — Jennifer A Leung
(74) *Attorney, Agent, or Firm* — Dentons US LLP

(57) ABSTRACT

Disclosed are an apparatus and method for continuously producing carbon nanotubes. More specifically, disclosed are an apparatus for continuously producing carbon nanotubes including i) a reactor to synthesize carbon nanotubes, ii) a separator to separate a mixed gas from the carbon nanotubes transferred from the reactor, iii) a filter to remove all or part of one or more component gases from the separated mixed gas, and iv) a recirculation pipe to recirculate the filtered mixed gas to the reactor for carbon nanotubes.

11 Claims, 2 Drawing Sheets

(51) Int. Cl.
  *D01F 9/133* (2006.01)
  *B01J 8/10* (2006.01)
  *B01J 8/00* (2006.01)
  *B01J 8/02* (2006.01)
  *B82Y 30/00* (2011.01)
  *B82Y 40/00* (2011.01)
  *B01D 45/12* (2006.01)

(52) U.S. Cl.
  CPC ............. *B01J 8/025* (2013.01); *B01J 8/24* (2013.01); *B82Y 30/00* (2013.01); *B82Y 40/00* (2013.01); *C01B 31/024* (2013.01); *C01B 31/0226* (2013.01); *D01F 9/133* (2013.01); *B01J 2208/0053* (2013.01); *B01J 2208/00176* (2013.01); *B01J 2208/00274* (2013.01); *B01J 2208/00548* (2013.01)

(56) References Cited

U.S. PATENT DOCUMENTS

2013/0315813 A1    11/2013  Chang
2013/0336875 A1*   12/2013  Chang et al. .............. 423/447.3

FOREIGN PATENT DOCUMENTS

| KR | 1020080085150 A | | 9/2008 |
| WO | WO 03066521 A1 | * | 8/2003 |
| WO | 2005054124 A1 | | 6/2005 |
| WO | 2007141558 A2 | | 12/2007 |

* cited by examiner

APPARATUS AND METHOD FOR CONTINUOUSLY PRODUCING CARBON NANOTUBES

This application is a National Stage entry of International Application No. PCT/KR2011/006161, filed on Aug. 19, 2011, which claims priority to Korean Patent Application Nos. 10-2011-0030514, filed Apr. 4, 2011 and 10-2011-0031471, filed on Apr. 6, 2011, with the Korean Patent Office, all of which are incorporated herein in their entirety by reference.

TECHNICAL FIELD

The present invention relates to an apparatus and method for continuously producing carbon nanotubes. More specifically, the present invention relates to an apparatus for continuously producing carbon nanotubes which enables rapid processing, exhibits superior productivity and excellent conversion rate of a carbon source, significantly reduces production costs, reduces energy consumption due to decrease in reactor size relative to capacity, and generates little or no waste gas and is thus environmentally friendly, and a method for continuously producing carbon nanotubes using the apparatus.

BACKGROUND ART

Carbon nanotubes (hereinafter, referred as to 'CNT') are generally prepared by arc discharge, laser ablation, chemical vapor deposition or the like.

However, the arc discharge and laser ablation are disadvantageously difficult to mass-produce, and involve excessive preparation costs and purchase costs of a laser apparatus.

Furthermore, chemical vapor deposition has problems in that a synthesis rate is very slow and CNT particles that are synthesized are excessively small in the case of using a vapor dispersion catalyst and there is a limit to mass production of CNT because a space use efficiency in the reactor is significantly reduced in the case of using a substrate-supported catalyst.

Improved methods for mass-producing CNT have been disclosed and examples thereof include a rotary kiln method for producing CNT by incorporating a catalyst in a rotating drum reactor and then adding a reaction gas thereto, and a method for synthesizing CNT using a fluidized bed reactor including forming a fluidized bed, in which a fluid medium flows when heated, in a reactor, and synthesizing CNT in the fluidized bed.

However, in accordance with these CNT mass-production methods, a reactive gas containing hydrocarbon gas, inert dilute gas and reducing gas to control CNT production reactions at high temperatures is incorporated in a reactor and a carbon source is thus converted into CNT and consumed in the reactor to produce double reducing gas (specific example, hydrogen gas) as a by-product. Accordingly, there is a need for a technical method to control a mix ratio of these gases to a predetermined level.

However, conventional methods using rotary kiln reactors and fluidized bed reactors have problems in that a conversion ratio of carbon source is at most 80%, in particular, the mixed gas emitted from the reactor is inevitably directly incinerated and the cost of raw materials is thus increased due to absence of a method for selectively disposing of the reducing gas produced as a byproduct, unit productivity is limited due to excessive equipment scale, and a great amount of carbon dioxide is emitted during incineration of waste gas.

DISCLOSURE

Technical Problem

Therefore, the present invention has been made in view of the above problems, and it is one object of the present invention to provide an apparatus for continuously producing carbon nanotubes which enables rapid processing, exhibits superior productivity and high conversion rate of a carbon source, significantly reduces production costs, reduces energy consumption due to decrease in reactor size relative to capacity, and generates little or no waste gas and is thus environmentally friendly, and a method for continuously producing carbon nanotubes using the apparatus.

The above and other objects can be accomplished by the present invention described below.

Technical Solution

In accordance with an aspect of the present invention, the above and other objects can be accomplished by the provision of an apparatus for continuously producing carbon nanotubes, including i) a reactor to synthesize carbon nanotubes; ii) a separator to separate a mixed gas from the carbon nanotubes transferred from the reactor; iii) a filter to remove all or part of one or more component gases from the separated mixed gas; and iv) a recirculation pipe to recirculate the filtered mixed gas to the reactor for carbon nanotubes.

In accordance with another aspect of the present invention, provided is a method for continuously producing carbon nanotubes including: i) reacting a reaction gas containing a carbon source, a reducing gas, and an inert gas with a catalyst to synthesize carbon nanotubes; ii) separating a mixed gas discharged along with the synthesized carbon nanotubes; iii) filtering the separated mixed gas to remove the reducing gas produced during the reaction i); and iv) recirculating the filtered mixed gas to the reaction i).

Advantageous Effects

The present invention advantageously provides an apparatus for continuously producing carbon nanotubes which enables rapid processing, exhibits superior productivity and excellent conversion rate of a carbon source, significantly reduces production costs, reduces energy consumption due to decrease in reactor size relative to capacity, and generates little or no waste gas and is thus environmentally friendly, and a method for continuously producing carbon nanotubes using the apparatus.

DESCRIPTION OF DRAWINGS

The above and other objects, features and advantages of the present invention will become apparent from the following description of preferred embodiments given in conjunction with the accompanying drawings, in which.

BEST MODE

Figure 1:
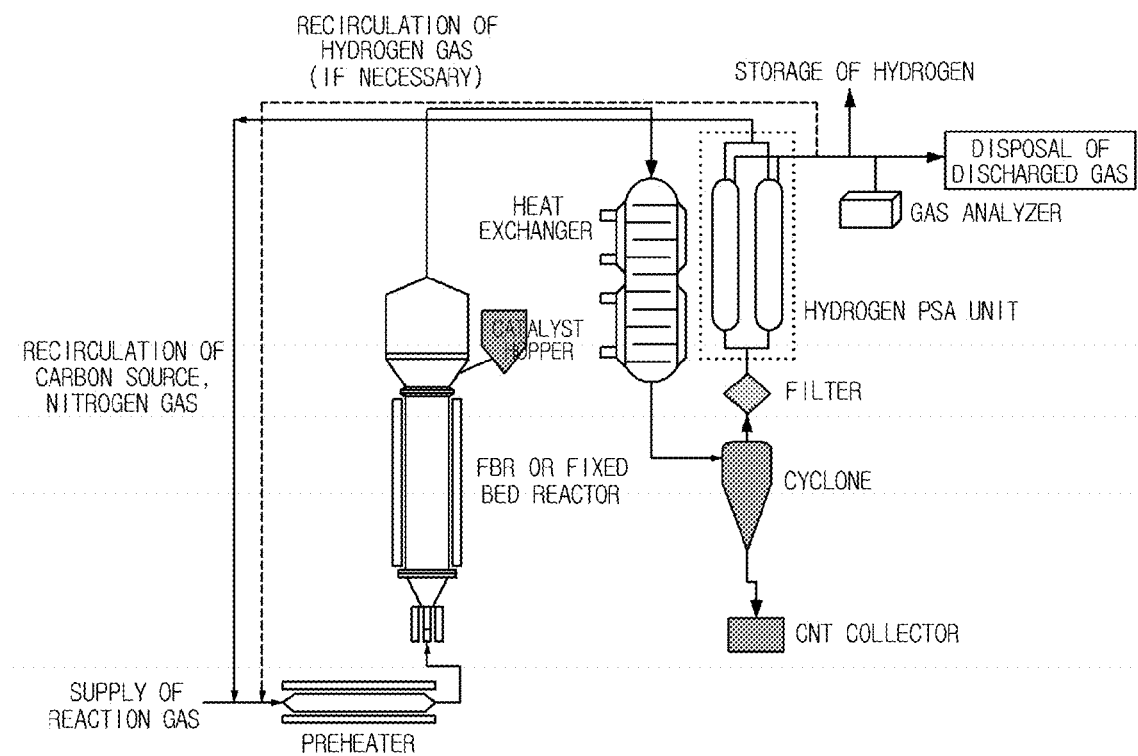
FIG. 1 is a process view illustrating a continuous CNT production apparatus including a hydrogen PSA unit according to an embodiment of the present invention.

Hereinafter, the present invention will be described in detail.

The present invention provides an apparatus for continuously producing carbon nanotubes, including i) a reactor to synthesize carbon nanotubes; ii) a separator to separate a mixed gas from the carbon nanotubes transferred from the reactor; iii) a filter to remove all or part of one or more component gases from the separated mixed gas; and iv) a recirculation pipe to recirculate the filtered mixed gas to the reactor for the carbon nanotubes.

The carbon nanotube reactor i) may be a chemical vapor deposition reactor, preferably a fluidized bed reactor (hereinafter, referred to as an 'FBR'), a fixed bed reactor, or a rotary reactor, more preferably a rotary kiln type reactor or a fluidized bed reactor, and most preferably a fluidized bed reactor. The fluidized bed reactor has advantages excellent productivity and easy CNT mass-production, as compared with reactor volume.

The fluidized bed reactor preferably produces CNTs by feeding a carbon source, a reducing gas, an inert gas and the like through a reaction gas feed pipe to a reactor from bottom to top and bringing the gases into contact with a catalyst injected to the reactor through a catalyst gas feed pipe in the upper part of the reactor to induce reaction between the gases and the catalyst.

Any reaction gas feed pipe may be used without particular limitation so long as it is generally useful for CNT production apparatuses. Specifically, the reaction gas feed pipe may be a gas distributor or the like.

Any catalyst feed pipe may be used without particular limitation so long as it is generally useful for CNT production apparatuses. Specifically, the catalyst feed pipe may be a hopper or the like.

The catalyst may be a heterogeneous catalyst having a complex structure containing an active metal and a support material commonly used for the production of CNT. More specifically, the catalyst may be a supported catalyst, a co-precipitation catalyst or the like.

In a case where a supported catalyst is used as a preferred catalyst, the supported catalyst advantageously has a higher bulk density than a co-precipitation catalyst and reduces a possibility of production of fine powder by attrition that may be generated in a fluidizing process due to small amount of fine powder of 10 microns or less unlike the co-precipitation catalyst, and exhibits superior mechanical strength and thus enables the reactor to stably operate.

In a case where a co-precipitation catalyst is used as a preferred catalyst, the co-precipitation catalyst has advantages of simple preparation method, merits in terms of preparation costs owing to low price of preferred metallic salts as catalyst materials and high catalyst activity due to wide specific surface area.

The inert gas may be nitrogen ($N_2$), argon (Ar), or the like.

For example, the fluidized bed reactor may operate as follows. A fluidized bed is formed in the reactor, a catalyst contacts a reaction gas in the fluidized bed to cause reaction, CNTs are grown on an activated metal of the catalyst, as the reaction progresses, and are then discharged from the reactor when a bulk density of the product decreases.

The bulk density may be 0.03 to 0.3 $g/cm^3$, and preferably 0.01 to 0.1 $g/cm^3$.

The fluidization velocity of the fluidized bed formed in the fluidized bed reactor is preferably 0.03 to 30 cm/s, and more preferably 0.1 to 25 cm/s.

The minimum fluidization velocity of the fluidized bed in the fluidized bed reactor is preferably 0.03 to 15 cm/s, and more preferably 1 to 10 cm/s.

The rotary kiln reactor or the fluidized bed reactor may be connected to a catalyst supply pipe to supply the catalyst, a reaction gas supply pipe to supply a carbon source, a reducing gas and an inert gas, and a product discharge pipe to discharge produced carbon nanotubes and the mixed gas containing a reaction byproduct gas.

The carbon source is a carbon-containing gas that may be degraded when heated and specific examples thereof include aliphatic alkanes, aliphatic alkenes, aliphatic alkynes and aromatic compounds. More specifically, examples thereof include methane, ethane, ethylene, acetylene, ethanol, methanol, acetone, carbon monoxide, propane, butane, benzene, cyclohexane, propylene, butene, isobutene, toluene, xylene, cumene, ethylbenzene, naphthalene, phenanthrene, anthracene, formaldehyde, acetaldehyde and the like. Preferred are methane ($CH_4$), ethane ($C_2H_6$), carbon monoxide (CO), acetylene ($C_2H_2$), ethylene ($C_2H_4$), propylene ($C_3H_6$), butane ($C_4H_{10}$) and liquefied petroleum gas (LPG) as a mixture.

The separator ii) is not specifically limited so long as it is a tool, equipment or apparatus which is capable of separating the mixed gas from CNT and is preferably a cyclone.

The filter iii) is not specifically limited so long as it is a material, equipment, machine, tool or apparatus which is capable of selectively separating or removing the mixed gas.

The filter iii) may independently separate the un-reacted carbon source, reducing gas and inert gas from the mixed gas discharged from the separator and may then selectively transfer the required amount of each gas to the recirculation pipe.

The filter iii) may remove a predetermined amount of reducing gas from the mixed gas discharged from the separator and then transfer the filtered mixed gas to the recirculation pipe.

The reducing gas may be hydrogen.

The filter iii) is preferably a metal membrane gas separation unit or a gas pressure swing adsorption unit which is capable of selectively separating or removing one or more gas components from the mixed gas.

Preferably, the filter iii) may be a gas pressure swing adsorption (PSA) unit.

The gas pressure swing adsorption (PSA) unit is preferably an adsorption tower or adsorption column (hereinafter, referred to as an "adsorption tower)) which adsorbs a predetermined amount of specific gas when pressurized and emits the specific gas when depressurized.

In addition, the filter iii) is preferably a hydrogen gas pressure swing adsorption (PSA) unit.

The hydrogen gas pressure swing adsorption (PSA) unit is preferably an adsorption tower which adsorbs a predetermined amount of hydrogen gas when pressurized and emits the adsorbed hydrogen gas when depressurized.

For reference, it can be confirmed that inputs of ethylene, hydrogen and nitrogen are reduced by 20 to 30%, 99% and 98%, respectively, as compared with an output of CNTs, when the CNT particles and mixed gas produced in the reactor pass through a heat exchanger and are then cooled, the CNT particles and mixed gas are separated from each other using a cyclone, and the separated CNT particles are sent to a collector and then collected, while the mixed gas passes through the hydrogen PSA unit and is then re-circulated.

The PSA unit preferably includes two or more adsorption towers, more preferably 2 to 6 adsorption towers. In this case, there are advantages in terms of continuous processing, control of adsorption amount and selective gas separation.

Preferably, the PSA unit is designed to adsorb a specific gas by pressurizing an adsorption tower through which the mixed gas passes and, at the same time, to emit the specific gas by depressurizing the adsorption tower in which the mixed gas is not passed and a specific gas is adsorbed.

Preferably, the adsorption towers are designed to alternately repeatedly undergo pressurization and depressurization and thereby facilitate the continuous process.

Preferably, the PSA unit includes a first fluid direction controller to direct the mixed gas discharged from the separator to the adsorption tower to perform pressurization, a second fluid direction controller to direct the filtered mixed gas to the recirculation pipe and a third fluid direction controller to direct a specific gas discharged from the depressurized adsorption tower to a discharge gas disposal or storage unit.

The PSA unit preferably includes a connector to connect the first to third fluid direction controllers.

Preferably, the filter iii) may be a metal membrane gas separation unit.

The metal membrane gas separation unit selectively separates hydrogen at a temperature lower than 500° C. and the metal membrane is selected from Pd, Ir, Rh, Pd—Ni alloys, Pd—Ag alloys and Pd—Cu alloys, and combinations thereof. Of these, Pd and Pd alloys are preferred, although the metal membrane is not limited thereto.

The metal membrane may be used in plural. The use of one to four metal membranes may be advantageous in terms of continuous processing, control of adsorption amount and control of recirculated and supplied composition. However, Pd and Pd alloys having high separation efficiency can be filtered through a single membrane, and the pressure and supply amount thereof can be controlled through a separation unit.

For reference, it can be seen confirmed that inputs of ethylene, hydrogen and nitrogen are decreased by 20 to 30%, 99% and 98%, respectively, as compared with an output of CNTs, when the CNT particles and mixed gas produced in the reactor pass through a heat exchanger and are then cooled, the CNT particles and mixed gas are separated from each other using a cyclone, and the CNT particles are sent to a collector and then collected, while the mixed gas passes through the metal membrane gas separation unit and is then re-circulated.

The fluidized bed reactor is connected to a reactive gas supply pipe 1, through which a carbon source, a reducing gas, an inert gas or the like are supplied, and preheats the gases at about 200 to about 500° C. using a pre-heater 100 and contact-reacts the gases with a catalyst supplied from bottom to top in the reactor 200 through a catalyst supply pipe arranged in an upper region to produce CNTs.

A part of specific gas (such as a part of $H_2$, un-reacted carbon source, $N_2$ and other inert gases, additional gases such as $NH_3$ or $H_2O$) emitted from the adsorption tower may be supplied to the recirculation pipe or reactive gas supply pipe, as necessary, in particular, when the specific gas in the filtered mixed gas is deficient.

The unreacted carbon source contained in the mixed gas is preferably controlled to 2 to 30% of carbon source supplied to the reactor, more preferably 5 to 20%.

The CNT production apparatus realizes ideal process operation which has substantially constant composition rate and amount, since only a catalyst and the carbon source consumed in the reactor are injected therein.

The CNT production apparatus can selectively re-circulate the mixed gas containing the un-reacted carbon source, the inert gas, the byproduct gas, and the like that have been generally incinerated or discharged using conventional a flare stack, incinerator or the like to secure at least 98% of a carbon source conversion rate without additionally injecting any inert gas. Accordingly, the CNT production apparatus significantly reduces CNT production costs, eliminates the necessity of incineration, is free of a problem in which carbon dioxide is released to the atmosphere and thus realizes an environmentally friendly process.

In addition, the CNT production apparatus can significantly decrease the size of the fluidized bed as compared with capacity of low-energy consumption equipment and thus energy cost of the fluidized bed reactor which operates at 600 to 1,000° C.

For the CNT production apparatus, the heat exchanger may be connected between the reactor and the separator or between the separator and CNT collector and, preferably, may be connected between the reactor and the separator.

The expression "between the reactor and the separator" includes the inside of the reactor and a filter may be arranged in an expander part of the fluidized bed reactor along with the heat exchanger.

When the reactor is designed to collect CNTs synthesized in the reactor at the bottom part of the reactor, the filter may be installed in the reaction apparatus to remove fine powders contained in the mixed gas that is discharged at the upper part thereof, and also when the heat exchanger is provided in the reaction apparatus, the separator, such as cyclone, may be also arranged in the reaction apparatus.

The component gas of the filter iii) may be a byproduct gas produced in the reactor i).

The continuous CNT production apparatus preferably further includes a control unit to control the amount of the reaction gas supplied to the reactor and the amount of component gas removed in the filter.

The control unit may control the amount of the reducing gas supplied to the reactor and the amount of the reducing gas passing through the filter.

The control unit may ensure that the amount of the reducing gas supplied to the reactor is equivalent to the amount of the reducing gas passed through the filter.

The continuous CNT production apparatus preferably further includes a filter, a scrubber or a combination thereof arranged between the separator ii) and the filter iii).

The filter collects CNT particles remaining in the mixed gas separated by the separator, and the scrubber removes harmful materials, such as halides, present in the mixed gas separated by the separator.

The continuous CNT production apparatus preferably further includes a pre-heater to preheat the reactive gas before the reactive gas is injected into the reactor.

The continuous CNT production apparatus considerably increases production cost saving, since injection of a greater amount of inert gas and a reducing gas in an amount equivalent to or greater than the amount of carbon source is required, as the reactor size increases.

The continuous CNT production apparatus may not include a waste gas incineration unit such as a flare stack, incinerator or the like.

The method for continuously producing carbon nanotubes according to the present invention comprises: i) reacting a reaction gas containing a carbon source, a reducing gas, and an inert gas with a catalyst to synthesize carbon nanotubes; ii) separating a mixed gas discharged along with the synthesized carbon nanotubes; iii) filtering the separated mixed gas to remove all or part of the reducing gas produced during the reaction i); and iv) recirculating the filtered mixed gas to the reaction i).

The amount of reducing gas that is removed in the filtration iii) preferably corresponds to the amount of reducing gas produced in the reaction i).

The molar ratio of the carbon source to the reducing gas is preferably 1:0.5 to 1:10, more preferably 1:0.9 to 1:6, and most preferably 1:1 to 1:5. Within this range, there is an effect of suppressing production of amorphous carbon through controlling the production rate of carbon nanotubes and thereby increasing the production of graphitic carbon.

In the process of producing CNTs i), if necessary, one or more selected from the group consisting of water, ammonia, NO, $NO_2$, and the like can be further injected.

As a specific example, the catalyst may be produced by dissolving a catalyst-active metal precursor such as $Co(NO_3)_2 \cdot 6H_2O$, $(NH_4)_6Mo_7O_{24} \cdot 4H_2O$, $Fe(NO_3)_2 \cdot 6H_2O$, $Ni(NO_3)_2 \cdot 6H_2O$ or the like in distilled water and wet impregnating the solution in a carrier such as $Al(OH)_3$, $Mg(NO_3)_2$, or colloidal silica.

In addition, the catalyst may be produced by treating a catalyst active metal precursor and a carrier such as $Al(OH)_3$, $Mg(NO_3)_2$, or colloidal silica with ultrasonic waves.

In addition, the catalyst may be produced by a sol-gel method using a chelating agent, such as citric acid, ethylenediaminetetraacetic acid (EDTA) etc., to smoothly dissolve catalyst active metal precursor, or may be produced by co-precipitating a catalyst active metal precursor well soluble in water.

The filtration iii) may be carried out by a separation method, unit or device which is capable of selectively separating the mixed gas.

Preferably, the filtration iii) may be carried out using a gas pressure swing adsorption (PSA) unit.

Preferably, the reducing gas is hydrogen and the gas PSA unit is a PSA unit.

Preferably, the filtration iii) may be carried out using a metal membrane gas separation unit.

The metal membrane gas separation unit selectively separates hydrogen at a temperature lower than 500° C. and the metal membrane is selected from Pd, Ir, Rh, Pd—Ni alloys, Pd—Ag alloys, Pd—Cu alloys and combinations thereof. Of these, Pd and Pd alloys are preferred, although the metal membrane is not limited thereto.

The continuous CNT production method may further include injecting a carbon source in an amount consumed in the reaction i) to the filtered mixed gas in the recirculation iv).

The continuous CNT production method may not include incinerating the waste gas.

Figure 2:
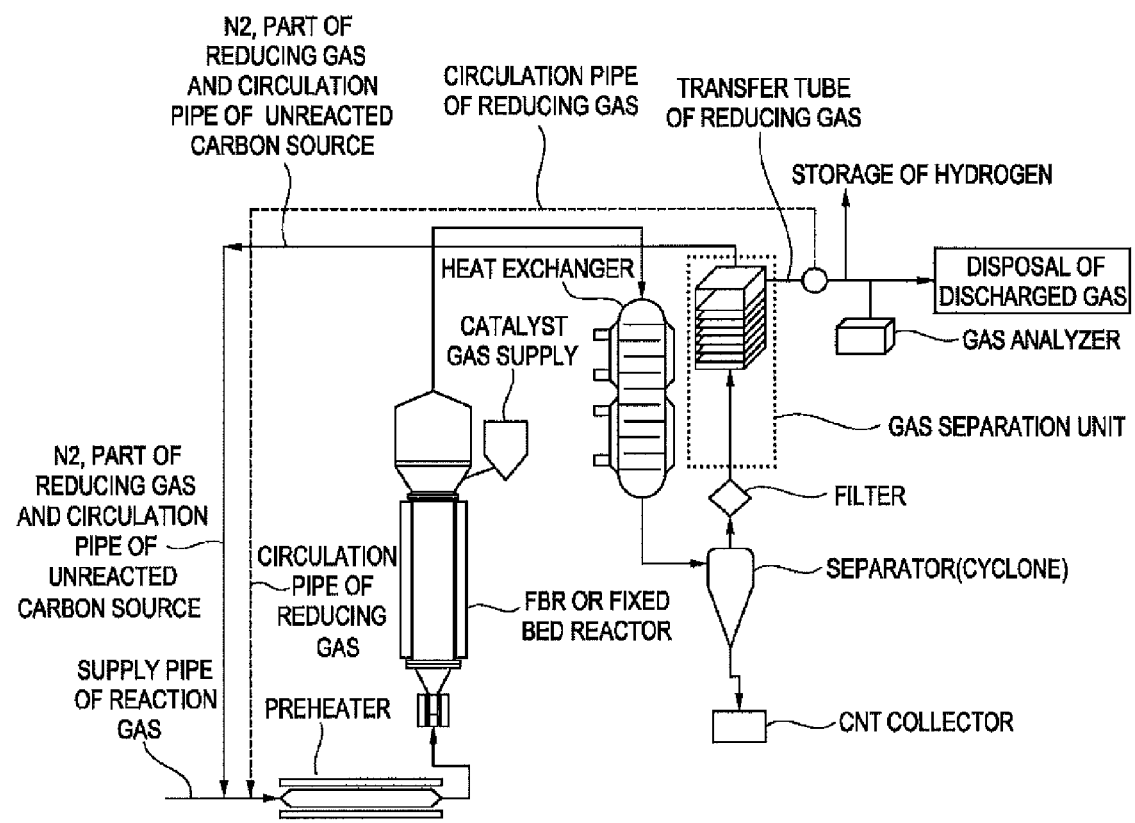
FIG. 2 is a process view illustrating a continuous CNT production apparatus provided with a gas separation unit including a metal membrane (hereinafter, referred to as a "metal membrane gas separation unit") according to an embodiment of the present invention.

A specific example of the continuous CNT production apparatus according to the present invention is schematically shown in FIGS. 1 and 2. Only the device required for describing the present invention is shown and other devices, including any pump, additional valve, pipe etc., that are required for performing the present method are excluded in FIGS. 1 and 2.

Hereinafter, although the preferred embodiments of the present invention will be disclosed for illustrative purposes, those skilled in the art will appreciate that various modifications, additions and substitutions are possible, without departing from the scope and spirit of the invention as disclosed in the accompanying claims.

EXAMPLES

Example 1

<Preparation of CNT Catalyst>

A flask A containing 200 ml of an aqueous solution of 37.039 g of $Co(NO_3)_2 \cdot 6H_2O$ and a flask B containing 200 ml of an aqueous solution of 32.30 g of $(NH_4)_6Mo_7O_{24} \cdot 4H_2O$ were prepared. Then, the solutions present in the flasks A and B were sequentially or simultaneously added to a flask C containing 50 g of $Al_2O_3$ (D50=76 micron, pore volume: 0.64 $cm^3$/g, surface area: 237 $m^2$/g, available from Saint Gobain Corporation), and a catalyst active metal precursor was then sufficiently supported on $Al_2O_3$, while stirring for 60 minutes or longer. Then, the resulting product was vacuum-filtered through a 10 micron filter paper or 4× glass filter to separate a filter cake in which the catalyst active metal precursor was supported and the filter cake was washed with distilled water and then collected. The collected filter cake was dried in an oven at 120° C. for 24 hours. The dried catalyst was fired for 3 hours at 600° C. to prepare a CNT catalyst.

<Production of CNTs>

5 g of the CNT catalyst was supplied to the top of a dispersion plate (in the form of a bubble cap or sieve) of a vertical fluidized bed reactor having a diameter of 55 mm and a height of 1 m, a reaction gas ($C_2H_4:H_2:N_2$=1:1:1) was injected into the reactor at a rate of 3,000 ml/min through a reaction gas supply pipe connected to the bottom part of the reactor and CNTs were synthesized at 800° C. for one hour.

The CNT production reaction was performed as a continuous reaction by separating a mixed gas (un-reacted carbon source, $C_2H_4$, inert gas, $N_2$, initially injected reducing gas, $H_2$, and $H_2$ produced as a byproduct) from the CNT product through a cyclone, selectively separating and discharging 30% of hydrogen gas from the mixed gas through a hydrogen PSA unit (two columns, each filled with 100 mL of Zeolite 5A) serving as a filter, and recirculating the filtered mixed gas (un-reacted $C_2H_4$, $N_2$ and $H_2$) through the recirculation pipe to the reaction gas supply line.

After one hour of reaction, CNTs collected in the CNT collector had a yield [(weight of CNTs collected−weight of catalyst injected)/weight of catalyst injected×100] of 950%, based on catalyst input.

Example 2

CNTs were produced in the same manner as in Example 1, except that the composition of the reaction gas was changed to $C_2H_4:H_2:N_2$=1:2:1 and 35% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 4.8% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 85% of the initial feed amount to the reaction gas supply pipe.

After one hour of reaction, CNTs collected in the CNT collector had a yield of 1,020%, based on catalyst input.

Example 3

CNTs were produced in the same manner as in Example 1, except that the composition of the reaction gas was changed to $C_2H_4:H_2:N_2=1:3:1$ and 29% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.6% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 85% of the initial feed amount to the reaction gas supply pipe.

After one hour of reaction, CNTs collected in the CNT collector had a yield of 780%, based on catalyst input.

Example 4

CNTs were produced in the same manner as in Example 1, except that the composition of the reaction gas was changed to $C_2H_4:H_2:N_2=1:4:1$ and 24% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.3% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 83% of the initial feed amount to the reaction gas supply pipe.

After one hour of reaction, CNTs collected in the CNT collector had a yield of 630%, based on catalyst input.

Example 5

CNTs were produced in the same manner as in Example 1, except that the composition of the reaction gas was changed to $C_2H_4:H_2:N_2=1:5:1$ and 20% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.2% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 80% of the initial feed amount to the reaction gas supply pipe.

After one hour of reaction, CNTs collected in the CNT collector had a yield of 580%, based on catalyst input.

Example 6

3 g of the CNT catalyst prepared in Example 1 above was charged into a 15 cm cylindrical reaction module, both sides of which were supported by a protruded ring structure and were composed of a 10 micron mesh, arranged in a rotary drum reactor having a diameter of 55 mm and a height of 60 cm, and then supplied through the catalyst gas supply pipe to the reactor. The reaction gas ($C_2H_4:H_2:N_2=1:1:1$) was added to the reactor at a rate of 1,500 ml/min through the reaction gas supply pipe. The reactor was tilted at an angle of 30 degrees and rotated at a rate of 30 rpm. The reaction was progressed for 60 minutes at 800° C. to synthesize CNTs.

The CNT production reaction was performed as a continuous reaction by separating a mixed gas (un-reacted carbon source, $C_2H_4$, inert gas, $N_2$, initially injected reducing gas, $H_2$, and $H_2$ produced as a byproduct) from the CNT product through a cyclone, selectively separating and discharging 35% of hydrogen gas from the mixed gas through a hydrogen PSA unit (two columns, each filled with 1,000 mL of Zeolite 5A) serving as a filter, and recirculating the filtered mixed gas (un-reacted $C_2H_4$, $N_2$ and $H_2$) through the recirculation pipe to the reaction gas supply line.

After one hour of reaction, CNTs collected in the CNT collector had a yield of 1,050%, based on catalyst input.

Example 7

CNTs were produced in the same manner as in Example 6, except that the composition of the reaction gas was changed to $C_2H_4:H_2:N_2=1:2:1$ and 36% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 4.2% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 87% of the initial feed amount to the reaction gas supply pipe.

After one hour of reaction, CNTs collected in the CNT collector had a yield of 850%, based on catalyst input.

Example 8

CNTs were produced in the same manner as in Example 6, except that the composition of the reaction gas was changed to $C_2H_4:H_2:N_2=1:3:1$ and 29% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.6% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 85% of the initial feed amount to the reaction gas supply pipe.

After one hour of reaction, CNTs collected in the CNT collector had a yield of 680%, based on catalyst input.

Example 9

CNTs were produced in the same manner as in Example 6, except that the composition of the reaction gas was changed to $C_2H_4:H_2:N_2=1:4:1$ and 24% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.7% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 81% of the initial feed amount to the reaction gas supply pipe.

After one hour of reaction, CNTs collected in the CNT collector had a yield of 560%, based on catalyst input.

Example 10

CNTs were produced in the same manner as in Example 6, except that the composition of the reaction gas was changed to $C_2H_4:H_2:N_2=1:5:1$ and 21% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.0% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 81% of initial feed amount to the reaction gas supply pipe.

After one hour of reaction, CNTs collected in the CNT collector had a yield of 490%, based on catalyst input.

Example 11

<Preparation of CNT Catalyst>

A flask A containing 300 ml of an aqueous solution of 37.039 g of $Co(NO_3)_2\cdot 6H_2O$ and a flask B containing 300 ml of an aqueous solution of 32.30 g of $(NH_4)_6Mo_7O_{24}\cdot 4H_2O$ were prepared. Then, the solutions present in the flasks A and B were added to MgO (particle size: 44 to 106 microns, available from Sigma-Aldrich Corp.) and sufficiently supported in $Al_2O_3$, while stirring for 60 minutes or longer. Then, the resulting product was vacuum-filtered through a 10 micron filter paper to separate a filter cake and the filter cake was washed with distilled water and then collected. The collected filter cake was dried in an oven at 120° C. for 24 hours. The dried catalyst was fired for 3 hours at 800° C. to prepare a CNT catalyst.

<Production of CNTs>

5 g of the CNT catalyst was supplied to the top of a dispersion plate of a vertical fluidized bed reactor having a diameter of 55 mm and a height of 1 m, a reaction gas ($C_2H_4:H_2:N_2=1:2:1$) was injected into the reactor at a rate of 3,000 ml/min through a reaction gas supply pipe connected to the bottom part of the reactor and CNTs were synthesized at 800° C. for one hour.

The CNT production reaction was performed as a continuous reaction by separating a mixed gas (un-reacted carbon source, $C_2H_4$, inert gas, $N_2$, initially injected reducing gas, $H_2$, and $H_2$ produced as a byproduct) from the CNT product through a cyclone, selectively separating and discharging 34% of hydrogen gas from the mixed gas through a hydrogen PSA unit (two columns, each filled with 1,000 mL of Zeolite 5A) serving as a filter, and recirculating the filtered mixed gas (un-reacted $C_2H_4$, $N_2$ and $H_2$) through the recirculation pipe to the reaction gas supply line.

After one hour of reaction, CNTs collected in the CNT collector had a yield [(weight of CNTs collected−weight of catalyst injected)/weight of catalyst injected×100] of 1,030%, based on catalyst input.

Accordingly, the present invention realizes continuous production of CNTs by supplementing only ethylene deficiency without additionally supplying $N_2$ and $H_2$ among initially added reaction gas components.

Example 12

CNTs were produced in the same manner as in Example 11, except that the composition of the reaction gas was changed to $C_2H_4:H_2:N_2=1:3:1$ and 29% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.8% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 84% of initial feed amount to the reaction gas supply pipe.

After one hour of reaction, CNT collected in the CNT collector had a yield of 810%, based on catalyst input.

Example 13

CNTs were produced in the same manner as in Example 11, except that the composition of the reaction gas was changed to $C_2H_4:H_2:N_2=1:4:1$ and 24% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.6% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 81% of the initial feed amount to the reaction gas supply pipe.

After one hour of reaction, CNTs collected in the CNT collector had a yield of 670%, based on catalyst input.

Example 14

CNTs were produced in the same manner as in Example 11, except that the composition of the reaction gas was changed to $C_2H_4:H_2:N_2=1:5:1$ and 21% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.2% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 80% of the initial feed amount to the reaction gas supply pipe.

After one hour of reaction, CNT collected in the CNT collector had a yield of 560%, based on catalyst input.

Example 15

3 g of the CNT catalyst prepared in Example 11 above was charged into a 15 cm cylindrical reaction module, both sides of which were supported by a protruded ring structure and were composed of a 10 micron mesh, arranged in a rotary drum reactor having a diameter of 55 mm and a height of 60 cm, and then supplied through the catalyst gas supply pipe to the reactor. The reaction gas ($C_2H_4:H_2:N_2=1:1:1$) was added to the reactor at a rate of 1,500 ml/min through the reaction gas supply pipe. The reactor was tilted at an angle of 30 degrees and rotated at a rate of 30 rpm. The reaction was progressed for 60 minutes at 800° C. to synthesize CNTs.

The CNT production reaction was performed as a continuous reaction by separating a mixed gas (un-reacted carbon source, $C_2H_4$, inert gas, $N_2$, initially injected reducing gas, $H_2$, and $H_2$ produced as byproduct) from the CNT product through a cyclone, selectively separating and discharging 40% of hydrogen gas from the mixed gas through a hydrogen PSA unit serving as a filter, and recirculating the filtered mixed gas (un-reacted $C_2H_4$, $N_2$ and $H_2$) through the recirculation pipe to the reaction gas supply line.

After one hour of reaction, CNT collected in the CNT collector had a yield of 980%, based on catalyst input.

Example 16

CNTs were produced in the same manner as in Example 15, except that the composition of the reaction gas was changed to $C_2H_4:H_2:N_2=1:2:1$ and 36% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.8% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 88% of the initial feed amount to the reaction gas supply pipe.

After one hour of reaction, CNTs collected in the CNT collector had a yield of 840%, based on catalyst input.

Example 17

CNTs were produced in the same manner as in Example 15, except that the composition of the reaction gas was changed to $C_2H_4:H_2:N_2=1:3:1$ and 29% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 2.9% of un-reacted $C_2H_4$ to the reaction gas supply pipe. In addition, the amounts of $H_2$ and $N_2$ used were minimized by reacting, without an additional supply of $H_2$ and $N_2$, by performing a continuous operation through adding only $C_2H_4$ corresponding to 88% of the initial feed amount to the reaction gas supply pipe.

After one hour of reaction, CNTs collected in the CNT collector had a yield of 690%, based on catalyst input.

Example 18

CNTs were produced in the same manner as in Example 15, except that the composition of the reaction gas was changed to $C_2H_4:H_2:N_2=1:4:1$ and 24% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.3% of un-reacted $C_2H_4$ to the reaction gas supply pipe. In addition, the amounts of $H_2$ and $N_2$ used were minimized by reacting, without an additional supply of $H_2$ and $N_2$, by performing a continuous operation through adding only $C_2H_4$ corresponding to 83% of the initial feed amount to the reaction gas supply pipe.

After one hour of reaction, CNTs collected in the CNT collector had a yield of 560%, based on catalyst input.

Example 19

CNTs were produced in the same manner as in Example 15, except that the composition of the reaction gas was changed to $C_2H_4:H_2:N_2=1:5:1$ and 21% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 2.8% of un-reacted $C_2H_4$ to the reaction gas supply pipe. In addition, the amounts of $H_2$ and $N_2$ used were minimized by reacting, without an additional supply of $H_2$ and $N_2$, by performing a continuous operation through adding only $C_2H_4$ corresponding to 83% of the initial feed amount to the reaction gas supply pipe.

After one hour of reaction, CNTs collected in the CNT collector had a yield of 460%, based on catalyst input.

Example 20

<Preparation of CNT Catalyst>

A flask A containing 200 ml of an aqueous solution of 54.25 g of $Fe(NO_3)_2\cdot6H_2O$ and a flask B containing 200 ml of an aqueous solution of 32.30 g of $(NH_4)_6Mo_7O_{24}\cdot4H_2O$ were prepared. Then, the solutions present in the flasks A and B were added to 5 g of $SiO_2$ (D50=55 micron, surface area: 550 $m^2/g$, Merck 9385) and a catalyst active metal precursor was sufficiently supported in $Al_2O_3$, while stirring for 60 minutes or longer. Then, the resulting product was vacuum-filtered through a 10 micron filter paper to separate a filter cake and the filter cake was washed with distilled water and then collected. The collected filter cake was dried in an oven at 120° C. for 24 hours. The dried catalyst was fired for 3 hours at 800° C. to prepare a CNT catalyst.

<Production of CNTs>

5 g of the CNT catalyst was supplied to the top of a dispersion plate of a vertical fluidized bed reactor having a diameter of 55 mm and a height of 1 m (a predetermined amount of catalyst was initially added to the reactor and the catalyst was then continuously further added thereto), a reaction gas ($C_2H_4:H_2:N_2=1:1:1$) was injected into the reactor at a rate of 3,000 ml/min through a reaction gas supply pipe connected to the bottom part of the reactor and CNTs were synthesized at 800° C. for one hour.

The CNT production reaction was performed as a continuous reaction by separating a mixed gas (un-reacted carbon source $C_2H_4$, inert gas $N_2$, initially injected reducing gas $H_2$, and $H_2$ produced as a byproduct) from the CNT product through a cyclone, selectively separating and discharging 33% of hydrogen gas from the mixed gas through a hydrogen PSA unit (two columns, each filled with 1,000 mL of Zeolite 5A) serving as a filter, and recirculating the filtered mixed gas (un-reacted $C_2H_4$, $N_2$ and $H_2$) through the recirculation pipe to the reaction gas supply line.

After one hour of reaction, CNTs collected in the CNT collector had a yield [(weight of CNTs collected−weight of catalyst injected)/weight of catalyst injected×100] of 940%, based on catalyst input.

The filtered mixed gas was assayed by gas chromatography (GC). As a result, it could be seen that stable operation was possible by supplementing only ethylene deficiency without additionally supplying $N_2$ and $H_2$ among initially added reaction gas components, and CNTs could thus be continuously produced.

Example 21

CNTs were produced in the same manner as in Example 20, except that the composition of the reaction gas was changed to $C_2H_4:H_2:N_2=1:3:1$ and 27% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 4.8% of un-reacted $C_2H_4$ to the reaction gas supply pipe. In addition, the amounts of $H_2$ and $N_2$ used were minimized by reacting without an additional supply of $H_2$ and $N_2$, by performing a continuous operation through adding only $C_2H_4$ corresponding to 80% of the initial feed amount to the reaction gas supply pipe.

After one hour of reaction, CNTs collected in the CNT collector had a yield of 770%, based on catalyst input.

Example 22

CNTs were produced in the same manner as in Example 20, except that the composition of the reaction gas was changed to $C_2H_4:H_2:N_2=1:4:1$ and 23% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 4.2% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 78% of the initial feed amount to the reaction gas supply pipe.

After one hour of reaction, CNTs collected in the CNT collector had a yield of 610%, based on catalyst input.

Example 23

CNTs were produced in the same manner as in Example 20, except that the composition of the reaction gas was changed to $C_2H_4:H_2:N_2=1:5:1$ and 19% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 4.0% of un-reacted $C_2H_4$ to the reaction gas supply pipe. In addition the amounts of $H_2$ and $N_2$ used were minimized by reacting without an additional supply of $H_2$ and $N_2$, by performing a continuous operation through adding only $C_2H_4$ corresponding to 75% of the initial feed amount to the reaction gas supply pipe.

After one hour of reaction, CNTs collected in the CNT collector had a yield of 530%, based on catalyst input.

Example 24

3 g of the CNT catalyst prepared in Example 20 above was charged in a 15 cm cylindrical reaction module, both sides of which were supported by a protruded ring structure and were composed of a 10 micron mesh, arranged in a rotary drum reactor having a diameter of 55 mm and a height of 60 cm, and then supplied through the catalyst gas supply pipe to the reactor. The reaction gas ($C_2H_4:H_2:N_2=1:1:1$) was added to the reactor at a rate of 1,500 ml/min through the reaction gas supply pipe. The reactor was tilted at an angle of 30 degrees and rotated at a rate of 30 rpm. The reaction was progressed for 60 minutes at 800° C. to synthesize CNTs.

The CNT production reaction was performed as a continuous reaction by separating a mixed gas (un-reacted carbon source, $C_2H_4$, inert gas, $N_2$, initially injected reducing gas, $H_2$, and $H_2$ produced as byproduct) from the CNT product through a cyclone, selectively separating and discharging 40% of hydrogen gas from the mixed gas through a hydrogen PSA unit serving as a filter, and recirculating the filtered mixed gas (un-reacted $C_2H_4$, $N_2$ and $H_2$) through the recirculation pipe to the reaction gas supply line.

After one hour of reaction, CNTs collected in the CNT collector had a yield of 920%, based on catalyst input.

Example 25

CNTs were produced in the same manner as in Example 24, except that the composition of the reaction gas was changed to $C_2H_4:H_2:N_2=1:2:1$ and 35% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 4.8% of un-reacted $C_2H_4$ to the reaction gas supply pipe. In addition, the amounts of $H_2$ and $N_2$ used were minimized by reacting without an additional supply of $H_2$ and $N_2$ by performing a continuous operation through adding only $C_2H_4$ corresponding to 85% of the initial feed amount to the reaction gas supply pipe.

After one hour of reaction, CNTs collected in the CNT collector had a yield of 840%, based on catalyst input.

Example 26

CNTs were produced in the same manner as in Example 24, except that the composition of the reaction gas was changed to $C_2H_4:H_2:N_2=1:3:1$ and 29% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.6% of un-reacted $C_2H_4$ to the reaction gas supply pipe. In addition, the amounts of $H_2$ and $N_2$ used were minimized by reacting, without an additional supply of $H_2$ and $N_2$, by performing a continuous operation through adding only $C_2H_4$ corresponding to 85% of the initial feed amount to the reaction gas supply pipe.

After one hour of reaction, CNTs collected in the CNT collector had a yield of 670%, based on catalyst input.

Example 27

CNTs were produced in the same manner as in Example 24, except that the composition of the reaction gas was changed to $C_2H_4:H_2:N_2=1:4:1$ and 24% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.5% of un-reacted $C_2H_4$ to the reaction gas supply pipe. In addition, the amounts of $H_2$ and $N_2$ used were minimized by reacting, without an additional supply of $H_2$ and $N_2$, by performing a continuous operation through adding only $C_2H_4$ corresponding to 82% of the initial feed amount to the reaction gas supply pipe.

After one hour of reaction, CNTs collected in the CNT collector had a yield of 550%, based on catalyst input.

Example 28

CNTs were produced in the same manner as in Example 24, except that the composition of the reaction gas was changed to $C_2H_4:H_2:N_2=1:5:1$ and 20% of the hydrogen gas discharged from the reactor was selectively separated and discharged in the hydrogen PSA unit.

The reaction can be safely carried out by selectively removing only $H_2$ produced as a byproduct and recirculating the mixed gas consisting of the remaining $H_2$ and $N_2$, and 3.2% of un-reacted $C_2H_4$ to the reaction gas supply pipe. In addition, the amounts of $H_2$ and $N_2$ used were minimized by reacting without an additional supply of $H_2$ and $N_2$, by performing a continuous operation through adding only $C_2H_4$ corresponding to 80% of the initial feed amount to the reaction gas supply pipe.

After one hour of reaction, CNTs collected in the CNT collector had a yield of 480%, based on catalyst input.

In Examples 1 to 28, a carbon source conversion ratio was 98% or more, when $H_2$ prepared during the reaction was selectively separated and the remaining mixed gas was then recirculated.

Example 29

In addition, 25 g of an $Al_2O_3$ metal supported catalyst supported with 15 wt % Co and 5 wt % of Mo (pure metal content) prepared in the same manner as in Example 1 was charged in the reactor. 28.2 gmol/hr of ethylene, 28.2 gmol/hr of nitrogen and 84.7 gmol/hr of hydrogen as reaction gases were injected to the reactor. The temperature was controlled at 800° C. and then manipulated to synthesize the desired CNTs. As a result, 0.502 kg/hr of CNTs were produced in the reactor and ethylene of the reaction gas was consumed during the reaction and hydrogen was produced as a byproduct in the inlet of the reactor. For this reason, the composition of the gas (mixed gas) was changed and 7.3 gmol/hr of the ethylene, 28.2 gmol/hr of the nitrogen, and 126.5 gmol/hr of the hydrogen were discharged from the reactor. The discharged CNTs and mixed gas were separated from each other through the cyclone, only hydrogen produced as a byproduct in the reactor was selectively separated and discharged from the mixed gas through the hydrogen PSA unit serving as a filter, and the filtered mixed gas (un-reacted $C_2H_4$, $N_2$ and $H_2$) was resupplied through the recirculation pipe to the reactor. As a result, the amount of ethylene gas supplied to the reactor was considerably decreased to 21 gmol/hr.

Meanwhile, for the mixed gas re-circulated to the inlet of the reactor, it was confirmed that flow rates of ethylene, nitrogen and hydrogen were 7.2 gmol/hr, 27.4 gmol/hr and 84.7 gmol/hr, respectively. This means that the original feed rate of reaction gas can be considerably decreased by 26% (ethylene), 98% (nitrogen) and 99% (hydrogen), and the production cost of the desired CNTs can be thus significantly reduced, as compared with a conventional case in which the entire amount of discharged gas is incinerated.

The following Table 1 shows flow rate and composition of the mixed gas discharged from the reactor. The following Table 2 shows flow rate and composition of the mixed gas discharged from the hydrogen PSA unit.

TABLE 1

| Flow of gas (mixed gas) present in reactor | |
|---|---|
| Flow of gas present in reactor | 3.63 Nm³/h |
| Hydrogen in feed gas: | 78.1% |
| $C_2H_4$ in feed gas: | 4.5% |
| $N_2$ in feed gas: | 17.4% |

* Flow of gas present in reactor outlet corresponds to a total volume of mixed gas discharged from the reactor and supplied to the filter, as a separation unit.

TABLE 2

| Gas present in filter (hydrogen PSA unit) outlet (separated and discharged hydrogen gas) | |
|---|---|
| Hydrogen in product gas: | >98.6% (hydrogen recovery 33.04%) |
| $C_2H_4$ Residual in product gas: | ~0.2% |
| $N_2$ Residual in product gas: | ~1.2% |
| Flow of hydrogen gas selectively separated through separation unit | 1.03 Nm³/h |

Example 30

In addition, 25 g of an $Al_2O_3$ metal supported catalyst supported with 15 wt % Co and 5 wt % of Mo prepared in the same manner as in Example 1 was charged in the reactor. Ethylene, nitrogen and hydrogen as reaction gases were injected to the reactor at a flow rate of 26.2 gmol/hr, 26.2 gmol/hr and 104.7 g mol/hr, respectively. The temperature was controlled at 800° C. and then manipulated to synthesize the desired CNTs. As a result, 0.502 kg/hr of CNTs were produced in the reactor and ethylene of the reaction gas was consumed during the reaction and hydrogen was produced as a byproduct in the inlet of the reactor. For this reason, the composition of the gas (mixed gas) was changed and 5.2 gmol/hr of the ethylene, 26.2 gmol/hr of the nitrogen, and 146.6 gmol/hr of the hydrogen were discharged from the reactor. The discharged CNT and mixed gas were separated from each other through the cyclone, only hydrogen produced as a byproduct in the reactor was selectively separated and discharged from the mixed gas through the hydrogen PSA unit serving as a filter, and the filtered mixed gas (un-reacted $C_2H_4$, $N_2$ and $H_2$) was resupplied to the reactor through the recirculation pipe. As a result, the amount of ethylene gas supplied to the reactor was considerably decreased to 21 gmol/hr.

Meanwhile, for the mixed gas re-circulated to the inlet of the reactor, it was confirmed that flow rates of ethylene, nitrogen and hydrogen were 5.1 gmol/hr, 25.4 gmol/hr and 104.7 gmol/hr, respectively. This means that the original feed amount of reaction gas can be considerably decreased by 20% (ethylene), 98% (nitrogen), and 99% (hydrogen) and the production cost of the desired CNTs can thus be significantly reduced, as compared with a conventional case in which the entire amount of discharged gas is incinerated.

The following Table 3 shows flow rate and composition of the mixed gas discharged from the reactor. The following Table 4 shows flow rate and composition of the mixed gas discharged from the hydrogen PSA unit.

TABLE 3

Gas (mixed gas) present in reactor outlet

| | |
|---|---|
| Flow of gas present in reactor outlet | 3.99 Nm³/h |
| Hydrogen in feed gas: | 82.4% |
| $C_2H_4$ in feed gas: | 2.94% |
| $N_2$ in feed gas: | 14.7% |

TABLE 4

Filter (hydrogen PSA unit) outlet gas
(separated and discharged hydrogen gas)

| | |
|---|---|
| Hydrogen in product gas: | >98.6% (hydrogen recovery 28.6%) |
| $C_2H_4$ residual in product gas: | ~0.2% |
| $N_2$ residual in product gas: | ~1.2% |
| Flow of hydrogen gas selectively separated through separation unit | 0.96 Nm³/h |

Example 31

In addition, 25 g of an $Al_2O_3$ metal supported catalyst supported with 15 wt % Co and 5 wt % of Mo prepared in the same manner as in Example 1 was charged in the reactor. Ethylene, nitrogen and hydrogen as reaction gases were injected to the reactor at flow rates of 27.5 gmol/hr, 27.5 gmol/hr and 137.6 gmol/hr, respectively. The temperature was controlled at 800° C. and then manipulated to synthesize the desired CNTs. As a result, 0.502 kg/hr of CNTs were produced in the reactor and ethylene of the reaction gas was consumed during the reaction and hydrogen was produced as a byproduct in the inlet of the reactor. For this reason, the composition of the gas (mixed gas) was changed and ethylene, nitrogen, and hydrogen were discharged from the reactor at flow rates of 6.6 gmol/hr, 27.5 gmol/hr and 179.4 gmol/hr, respectively. The discharged CNT and mixed gas were separated from each other through the cyclone, only hydrogen produced as a byproduct in the reactor was selectively separated and discharged from the mixed gas through the hydrogen PSA unit serving as a filter, and the filtered mixed gas (un-reacted $C_2H_4$, $N_2$ and $H_2$) was resupplied through the recirculation pipe to the reactor. As a result, the amount of ethylene gas supplied to the reactor was considerably decreased to 21 gmol/hr.

Meanwhile, for the mixed gas re-circulated to the inlet of the reactor, it was confirmed that flow rates of ethylene, nitrogen and hydrogen were 6.5 gmol/hr, 26.7 gmol/hr and 137.6 gmol/hr, respectively. This means that the original feed rate of reaction gas can be considerably decreased by 24% (ethylene), 98% (nitrogen) and 99% (hydrogen), as compared with a conventional case in which the entire amount of discharged gas is incinerated, and the production cost of the desired CNTs can thus be significantly reduced.

The following Table 5 shows flow rate and composition of the mixed gas discharged from the reactor. The following Table 6 shows flow rate and composition of the mixed gas discharged from the hydrogen PSA unit.

TABLE 5

Gas (mixed gas) present in reactor outlet

| | |
|---|---|
| Flow of gas present in reactor outlet | 4.78 Nm³/h |
| Hydrogen in feed gas: | 84.02% |
| $C_2H_4$ in feed gas: | 3.1% |
| $N_2$ in feed gas: | 12.9% |

TABLE 6

Filter (hydrogen PSA unit) outlet gas
(separated and discharged hydrogen gas)

| | |
|---|---|
| Hydrogen in product gas: | >98.6% (hydrogen recovery 23.3%) |
| $C_2H_4$ residual in product gas: | ~0.2% |
| $N_2$ residual in product gas: | ~1.2% |
| Flow of hydrogen gas selectively separated through separation unit | 0.96 Nm³/h |

Examples 32 to 59

CNTs were prepared in the same manner as in Examples 1 to 28 except that a metal (Pd) membrane gas separation unit (Pd/alumina stainless steel membrane) was used instead of the hydrogen PSA unit. The $H_2$ separation efficiency (%) and CNT yield (%) thus obtained are shown in Table 8 below.

Example 60

CNTs were prepared in the same manner as in Example 29 except that a metal (Pd) membrane gas separation unit (Pd/alumina stainless steel membrane) was used instead of the hydrogen PSA unit.

The following Table 7 shows flow rate and composition of the mixed gas discharged from the reactor of Example 60. The following Table 8 shows flow rate and composition of the hydrogen gas separated and discharged through the metal (Pd) membrane gas separation unit of Example 60.

TABLE 7

Gas (mixed gas) present in reactor outlet

| | |
|---|---|
| Flow of gas present in reactor outlet | 3.63 Nm³/h |
| Hydrogen in feed gas: | 78.1% |
| $C_2H_4$ in feed gas: | 4.5% |
| $N_2$ in feed gas: | 17.4% |

TABLE 8

Filter (Pd metal membrane) outlet gas
(separated and discharged hydrogen gas)

| | |
|---|---|
| Hydrogen in product gas: | >98.6% (hydrogen recovery 33.04%) |
| $C_2H_4$ residual in product gas: | ~0.2% |
| $N_2$ residual in product gas: | ~1.2% |
| Flow of hydrogen gas selectively separated through separation unit | 0.96 Nm³/h |

Example 61

CNTs were prepared in the same manner as in Example 30 except that a metal (Pd) membrane gas separation unit (Pd/alumina stainless steel membrane) was used instead of the hydrogen PSA unit.

The following Table 9 shows flow rate and composition of the mixed gas discharged from the reactor of Example 61. The following Table 10 shows flow rate and composition of the hydrogen gas separated and discharged through the metal (Pd) membrane gas separation unit of Example 61.

TABLE 9

Gas present in reactor outlet (mixed gas)

| | |
|---|---|
| Flow of gas present in reactor outlet | 3.99 Nm³/h |
| Hydrogen in feed gas: | 82.4% |
| $C_2H_4$ in feed gas: | 2.94% |
| $N_2$ in feed gas: | 14.7% |

TABLE 10

Filter (Pd metal membrane) outlet gas
(separated and discharged hydrogen gas)

| | |
|---|---|
| Hydrogen in product gas: | >98.6% (hydrogen recovery 28.6%) |
| $C_2H_4$ residual in product gas: | ~0.2% |
| $N_2$ residual in product gas: | ~1.2% |
| Flow of hydrogen gas selectively separated through separation unit | 0.96 Nm³/h |

Example 62

CNTs were prepared in the same manner as in Example 31 except that a metal (Pd) membrane gas separation unit (Pd/alumina stainless steel membrane) was used instead of the hydrogen PSA unit.

The following Table 11 shows flow rate and composition of the mixed gas discharged from the reactor in Example 62. The following Table 12 shows flow rate and composition of the hydrogen gas separated and discharged through the metal (Pd) membrane gas separation unit in Example 62.

TABLE 11

Gas (mixed gas) present in reactor outlet

| | |
|---|---|
| Flow of gas present in reactor outlet | 4.78 Nm³/h |
| Hydrogen in feed gas: | 84.02% |
| $C_2H_4$ in feed gas: | 3.1% |
| $N_2$ in feed gas: | 12.9% |

TABLE 12

Filter (Pd metal membrane) outlet gas
(separated and discharged hydrogen gas)

| | |
|---|---|
| Hydrogen in Product Gas: | >98.6% (hydrogen recovery 23.3%) |
| $C_2H_4$ Residual in Product Gas: | ~0.2% |
| $N_2$ Residual in Product Gas: | ~1.2% |
| Flow of hydrogen gas selectively separated through separation unit | 0.96 Nm³/h |

Comparative Example 1

CNTs were produced in the same manner as in Example 2 above except that 100% of the mixed gas separated by the cyclone was re-circulated without passing through the hydrogen PSA unit and only ethylene ($C_2H_4$) corresponding to 85% of the initial feed amount was added to the reaction gas supply pipe.

The continuous operation was tried in the reaction, but 2 moles of hydrogen ($H_2$) produced as a reaction byproduct per one mole of ethylene was continuously accumulated in the reactor, thus causing an increase in pressure in the reactor and interfering with smooth injection of $C_2H_4$ and thereby making stable operation impossible within 20 minutes.

Comparative Example 2

CNTs were produced in the same manner as in Example 2 above except that the same composition and content of reaction gas as in Example 2 was continuously supplied without the hydrogen PSA unit and recirculation pipe.

This reaction exhibited increases in consumption levels of ethylene, nitrogen and hydrogen by 3-7 times, 80 to 100 times, and 100 times or more, respectively, as compared to Example 2 and thus considerably increasing CNT production costs.

After one hour of reaction, CNTs collected in the CNT collector had a yield of 830% and a carbon source conversion rate of 80% based on catalyst input.

Experimental Example

The reaction conditions, carbon source conversion rate and CNT yield of Examples 1 to 28 and 32 to 59 were measured in accordance with the following methods. The results thus obtained are shown in Tables 13 and 14 below.

Carbon source conversion rate (%) was obtained by measuring an amount of ethylene gas supplied to the reactor and an amount of ethylene gas discharged from the outlet of the reactor by gas chromatography and calculating the conversion rate in accordance with Equation 1 below:

Carbon source conversion rate=(flow of ethylene gas injected to reactor (gmol/hr)−flow of ethylene discharged from reactor (gmol/hr))×100/flow of ethylene injected to reactor (gmol/hr)   [Equation 1]

CNT Yield (%) was obtained from the difference between a weight of catalyst and a weight of CNTs measured after the reaction using a precise electronic scale in accordance with Equation 2 below:

Catalyst Yield (%)=(total weight of carbon product recovered (g)−weight of catalyst (g))×100/ weight of catalyst (g)

TABLE 13

| Ex. | Type of reactor | Catalyst | Amount of catalyst used | Gas feed composition $C_2H_4$ | $H_2$ | $N_2$ | Feed rate (ml/min) | Gas separation efficiency $H_2$ separation efficiency (%) | CNT yield (%) |
|---|---|---|---|---|---|---|---|---|---|
| 1 | FBR | CoMo/ | 5 g | 1 | 1 | 1 | 3000 | 20 | 950 |
| 2 | | $Al_2O_3$ | 5 g | 1 | 2 | 1 | 3000 | 33 | 1020 |
| 3 | | | 5 g | 1 | 3 | 1 | 3000 | 28 | 780 |
| 4 | | | 5 g | 1 | 4 | 1 | 3000 | 24 | 630 |

TABLE 13-continued

| Ex. | Type of reactor | Catalyst | Amount of catalyst used | Gas feed composition C₂H₄ | H₂ | N₂ | Feed rate (ml/min) | Gas separation efficiency H₂ separation efficiency (%) | CNT yield (%) |
|---|---|---|---|---|---|---|---|---|---|
| 5 |  |  | 5 g | 1 | 5 | 1 | 3000 | 20 | 580 |
| 6 | Rotary | CoMo/ | 3 g | 1 | 1 | 1 | 1500 | 25 | 1050 |
| 7 | kiln | Al₂O₃ | 3 g | 1 | 2 | 1 | 1500 | 35 | 850 |
| 8 | type |  | 3 g | 1 | 3 | 1 | 1500 | 36 | 680 |
| 9 |  |  | 3 g | 1 | 4 | 1 | 1500 | 24 | 560 |
| 10 |  |  | 3 g | 1 | 5 | 1 | 1500 | 21 | 490 |
| 11 | FBR | CoMo/ | 5 g | 1 | 2 | 1 | 3000 | 34 | 1030 |
| 12 |  | MgO | 5 g | 1 | 3 | 1 | 3000 | 29 | 810 |
| 13 |  |  | 5 g | 1 | 4 | 1 | 3000 | 24 | 670 |
| 14 |  |  | 5 g | 1 | 5 | 1 | 3000 | 21 | 560 |
| 15 | Rotary | CoMo/ | 3 g | 1 | 1 | 1 | 1500 | 40 | 980 |
| 16 | kiln | MgO | 3 g | 1 | 2 | 1 | 1500 | 36 | 840 |
| 17 | type |  | 3 g | 1 | 3 | 1 | 1500 | 29 | 690 |
| 18 |  |  | 3 g | 1 | 4 | 1 | 1500 | 24 | 560 |
| 19 |  |  | 3 g | 1 | 5 | 1 | 1500 | 21 | 460 |
| 20 | FBR | FeMo/ | 5 g | 1 | 2 | 1 | 3000 | 33 | 940 |
| 21 |  | SiO₂ | 5 g | 1 | 3 | 1 | 3000 | 27 | 770 |
| 22 |  |  | 5 g | 1 | 4 | 1 | 3000 | 23 | 610 |
| 23 |  |  | 5 g | 1 | 5 | 1 | 3000 | 19 | 530 |
| 24 | Rotary | FeMo/ | 3 g | 1 | 1 | 1 | 1500 | 40 | 920 |
| 25 | kiln | SiO₂ | 3 g | 1 | 2 | 1 | 1500 | 35 | 840 |
| 26 | type |  | 3 g | 1 | 3 | 1 | 1500 | 29 | 670 |
| 27 |  |  | 3 g | 1 | 4 | 1 | 1500 | 24 | 550 |
| 28 |  |  | 3 g | 1 | 5 | 1 | 1500 | 20 | 480 |

As can be seen from Examples 1 to 31 and Table 13 above, the CNT production apparatus and method according to the present invention including the hydrogen PSA unit (Examples 1 to 31) exhibited high carbon source conversion rate and CNT yield, considerably reduced CNT production costs, and produced no waste gas and thus was environmentally friendly, as compared to conventional CNT production apparatuses and methods (Comparative Examples 1 and 2).

TABLE 14

| Ex. | Type of reactor | Catalyst | Amount of catalyst used | Gas feed composition C₂H₄ | H₂ | N₂ | Feed rate (ml/min) | Gas separation efficiency (%) H₂ separation efficiency (%) | CNT yield (%) |
|---|---|---|---|---|---|---|---|---|---|
| 32 | FBR | CoMo/ | 5 g | 1 | 1 | 1 | 3000 | 20 | 940 |
| 33 |  | Al₂O₃ | 5 g | 1 | 2 | 1 | 3000 | 33 | 1010 |
| 34 |  |  | 5 g | 1 | 3 | 1 | 3000 | 28 | 780 |
| 35 |  |  | 5 g | 1 | 4 | 1 | 3000 | 24 | 640 |
| 36 |  |  | 5 g | 1 | 5 | 1 | 3000 | 20 | 570 |
| 37 | Rotary | CoMo/ | 3 g | 1 | 1 | 1 | 1500 | 25 | 1080 |
| 38 | kiln | Al₂O₃ | 3 g | 1 | 2 | 1 | 1500 | 35 | 840 |
| 39 | type |  | 3 g | 1 | 3 | 1 | 1500 | 36 | 680 |
| 40 |  |  | 3 g | 1 | 4 | 1 | 1500 | 24 | 560 |
| 41 |  |  | 3 g | 1 | 5 | 1 | 1500 | 21 | 490 |
| 42 | FBR | CoMo/ | 5 g | 1 | 2 | 1 | 3000 | 34 | 1030 |
| 43 |  | MgO | 5 g | 1 | 3 | 1 | 3000 | 29 | 810 |
| 44 |  |  | 5 g | 1 | 4 | 1 | 3000 | 24 | 675 |
| 45 |  |  | 5 g | 1 | 5 | 1 | 3000 | 21 | 560 |
| 46 | Rotary | CoMo/ | 3 g | 1 | 1 | 1 | 1500 | 40 | 1020 |
| 47 | kiln | MgO | 3 g | 1 | 2 | 1 | 1500 | 36 | 860 |
| 48 | type |  | 3 g | 1 | 3 | 1 | 1500 | 29 | 680 |
| 49 |  |  | 3 g | 1 | 4 | 1 | 1500 | 24 | 560 |
| 50 |  |  | 3 g | 1 | 5 | 1 | 1500 | 21 | 470 |
| 51 | FBR | FeMo/ | 5 g | 1 | 2 | 1 | 3000 | 33 | 940 |
| 52 |  | SiO₂ | 5 g | 1 | 3 | 1 | 3000 | 27 | 760 |
| 53 |  |  | 5 g | 1 | 4 | 1 | 3000 | 23 | 610 |
| 54 |  |  | 5 g | 1 | 5 | 1 | 3000 | 19 | 540 |
| 55 | Rotary | FeMo/ | 3 g | 1 | 1 | 1 | 1500 | 40 | 950 |
| 56 | kiln | SiO₂ | 3 g | 1 | 2 | 1 | 1500 | 35 | 850 |
| 57 | type |  | 3 g | 1 | 3 | 1 | 1500 | 29 | 670 |
| 58 |  |  | 3 g | 1 | 4 | 1 | 1500 | 24 | 550 |
| 59 |  |  | 3 g | 1 | 5 | 1 | 1500 | 20 | 460 |

As can be seen from Examples 32 to 62 and Table 14 above, the CNT production apparatus and method according to the present invention including the Pd metal membrane (Examples 32 to 62) exhibited high carbon source conversion rate and CNT yield, considerably reduced CNT production costs, and produced no waste gas and thus was environmentally friendly, as compared to conventional CNT production apparatuses and methods (Comparative Examples 1 and 2).

The invention claimed is:

1. An apparatus for continuously producing carbon nanotubes comprising:
   i) a reactor to synthesize carbon nanotubes, comprising a catalyst supply pipe equipped at a first top portion of the reactor to supply a catalyst into the reactor from the first top portion, a reaction gas supply pipe to supply a reaction gas including a carbon source, a reducing gas, and an inert gas into a bottom portion of the reactor, and a product discharge pipe at a second top portion of the reactor to discharge the produced carbon nanotubes and a mixed gas, and which is capable of extending a residence time in the reactor by increasing a contact time in the reactor by supplying the catalyst into the reactor from the first top portion together with the reaction gas into the reactor from the bottom portion of the reactor;
   ii) a separator to separate a mixed gas from the carbon nanotubes transferred from the reactor;
   iii) a hydrogen pressure swing adsorption (PSA) unit including two or more adsorption towers and two or more flow direction control valves that is configured to process removal of 19 to 34% of only hydrogen ($H_2$) gas produced as a byproduct gas in the reactor from the separated mixed gas from the separator;
   iv) a filter, a scrubber or a combination thereof arranged between (ii) the separator and (iii) the PSA unit; and
   v) a recirculation pipe to recirculate the processed gas including non-reacted carbon source, the inert gas and the reducing gas injected at the start of the reaction discharged from the PSA unit to the reactor for carbon nanotubes,
   wherein the reactor is a fluidized bed reactor,
   wherein the PSA unit includes a first flow direction control valve to direct the mixed gas discharged from the separator to a first adsorption tower to perform pressurization, a second flow direction control valve to direct the processed gas to the recirculation pipe and a third flow direction control valve to direct the hydrogen ($H_2$) gas discharged from a second adsorption tower, which is depressurized, toward a discharge gas disposal or hydrogen ($H_2$) storage unit, and
   wherein, in the PSA unit, the first to third flow direction control valves are connected.

2. The apparatus according to claim 1, wherein the separator is a cyclone.

3. The apparatus according to claim 1, comprising further a control unit to control the amount of the reaction gas supplied to the reactor and the amount of the gas removed in the PSA unit.

4. The apparatus according to claim 1, comprising further a control unit to control the amount of the reaction reducing gas supplied to the reactor and the amount of the reducing gas passed through the PSA unit.

5. The apparatus according to claim 4, wherein the control unit is adjusted to match the amount of reducing gas supplied to the reactor and the amount of reducing gas to pass through the PSA unit.

6. The apparatus according to claim 1 wherein the apparatus does not include any waste gas incineration means.

7. An apparatus for continuously producing carbon nanotubes comprising:
   i) a reactor to synthesize carbon nanotubes, comprising a catalyst supply pipe equipped at a first top portion of the reactor to supply a catalyst into the reactor from the first top portion, a reaction gas supply pipe to supply a reaction gas including a carbon source, a reducing gas, and an inert gas into a bottom portion of the reactor, and a product discharge pipe at a second top portion of the reactor to discharge the produced carbon nanotubes and mixed gas, and which is capable of extending a residence time in the reactor by increasing a contact time in the reactor by supplying the catalyst into the reactor from the first top portion together with the reaction gas into the reactor from the bottom portion of the reactor;
   ii) a separator to separate a mixed gas from the carbon nanotubes transferred from the reactor;
   iii) a metal membrane gas separation unit, wherein the metal membrane is made of at least one metal selected from the group consisting of Pd, Ir, Rh, Pd—Ni alloys, Pd—Ag alloys, and Pd—Cu alloys, and the metal membrane gas separation unit is configured to process removal of 19 to 34% of only hydrogen ($H_2$) gas produced as a byproduct gas in the reactor from the separated mixed gas from the separator at temperature below 500° C.;
   iv) a filter, a scrubber or a combination thereof arranged between (ii) the separator and (iii) the metal membrane gas separation unit; and
   v) a recirculation pipe to recirculate the processed gas including non-reacted carbon source, the inert gas and the reducing gas injected at the start of the reaction discharged from the metal membrane gas separation unit to the reactor for carbon nanotubes,
   wherein the reactor is a fluidized bed reactor.

8. The apparatus according to claim 7, comprising further a control unit to control the amount of the reaction gas supplied to the reactor and the amount of the gas removed in the separation unit.

9. The apparatus according to claim 7, comprising further a control unit to control the amount of the reaction reducing gas supplied to the reactor and the amount of the reducing gas passed through the separation unit.

10. The apparatus according to claim 9, wherein the control unit is adjusted to match the amount of reducing gas supplied to the reactor and the amount of reducing gas to pass through the separation unit.

11. The apparatus according to claim 7, wherein the apparatus does not include any waste gas incineration means.

* * * * *